United States Patent
Zhi et al.

(10) Patent No.: US 11,128,718 B2
(45) Date of Patent: Sep. 21, 2021

(54) METHOD, APPARATUS, AND SYSTEM FOR IMPLEMENTING HEARTBEAT MECHANISM

(71) Applicant: HUAWEI TECHNOLOGIES CO., LTD., Guangdong (CN)

(72) Inventors: Yanan Zhi, Shenzhen (CN); Wei Cheng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 291 days.

(21) Appl. No.: 16/023,532

(22) Filed: Jun. 29, 2018

(65) Prior Publication Data

US 2018/0309835 A1    Oct. 25, 2018

Related U.S. Application Data

(63) Continuation of application No. PCT/CN2016/112465, filed on Dec. 27, 2016.

(30) Foreign Application Priority Data

Dec. 31, 2015 (CN) .......................... 201511031806.8

(51) Int. Cl.
*H04L 12/26* (2006.01)
*H04L 29/08* (2006.01)
*H04L 12/911* (2013.01)

(52) U.S. Cl.
CPC ............ *H04L 67/145* (2013.01); *H04L 43/10* (2013.01); *H04L 67/2842* (2013.01); *H04L 47/822* (2013.01); *H04L 67/16* (2013.01)

(58) Field of Classification Search
CPC ....... H04L 47/822; H04L 67/16; H04L 41/12; H04L 43/10
See application file for complete search history.

(56) References Cited

U.S. PATENT DOCUMENTS 7,912,950 B1    3/2011  Saparoff
2009/0043887 A1  2/2009  Coekaerts
(Continued)

FOREIGN PATENT DOCUMENTS

CN    101115313 A    1/2008
CN    101771579 A    7/2010
(Continued)

*Primary Examiner* — Tom Y Chang
(74) *Attorney, Agent, or Firm* — Womble Bond Dickinson (US) LLP

(57) ABSTRACT

The method, an apparatus and a system for implementing a heartbeat mechanism, so as to reduce a quantity of heartbeat responses sent by a node, and reduce unnecessary resource consumption in a distributed database system. The solution includes: obtaining, a heartbeat request sent by a first node to a second node; recording, a first moment, wherein the first moment is a moment that the heartbeat request is received; querying, according to the identity of the second node from cached information, a second moment, wherein the second moment is a moment that the switching node most recently, where the cached information stores a correspondence between a moment at which the switching node receives a message and an identity of the node; and if an absolute value of a difference between the first moment and the second moment is less than a threshold, sending a heartbeat response to the first node.

12 Claims, 5 Drawing Sheets

Distributed database system

(56) References Cited

U.S. PATENT DOCUMENTS

| | | | |
|---|---|---|---|
| 2013/0039166 A1 | 2/2013 | Brown et al. | |
| 2014/0047000 A1 | 2/2014 | Zelek et al. | |
| 2015/0181617 A1* | 6/2015 | Luna | H04L 47/822 |
| | | | 455/450 |
| 2015/0254273 A1 | 9/2015 | Larson et al. | |
| 2016/0036682 A1* | 2/2016 | Griffith | G06F 11/3093 |
| | | | 709/224 |
| 2016/0072678 A1* | 3/2016 | Dong | H04W 4/70 |
| | | | 370/254 |

FOREIGN PATENT DOCUMENTS

| | | |
|---|---|---|
| CN | 102185740 A | 9/2011 |
| CN | 103117901 A | 5/2013 |
| CN | 103763155 A | 4/2014 |
| CN | 104506358 A | 4/2015 |
| CN | 104883279 A | 9/2015 |
| EP | 2717524 A1 | 4/2014 |

* cited by examiner

METHOD, APPARATUS, AND SYSTEM FOR IMPLEMENTING HEARTBEAT MECHANISM

CROSS-REFERENCE TO RELATED APPLICATIONS

This application is a continuation of International Application No. PCT/CN2016/112465, filed on Dec. 27, 2016, which claims priority to Chinese Patent Application No. 201511031806.8, filed on Dec. 31, 2015. The disclosures of the aforementioned applications are hereby incorporated by reference in their entireties.

TECHNICAL FIELD

The present invention relates to the field of computer technologies, and in particular, to a method, an apparatus, and a system for implementing a heartbeat mechanism.

BACKGROUND

A heartbeat mechanism means that a transmit end periodically sends a user-defined heartbeat request (for example, a heartbeat packet or a heartbeat frame), and after receiving the heartbeat request, a receive end returns a heartbeat response to the transmit end, so that the transmit end learns that the receive end is "online", so as to determine that the receive end can work properly currently.

In a distributed database system, to improve system reliability, multiple copies of a data sharding are stored. The multiple copies of the data sharding may be respectively stored on different nodes. A data synchronization unit may be formed by using a group of nodes on which the multiple copies are stored. To ensure data consistency between the multiple copies, data synchronization may be performed on the nodes in the data synchronization unit using a synchronization protocol (for example, the raft protocol). In a data synchronization process, it is required in the synchronization protocol that a heartbeat request and a heartbeat response are sent between the nodes in the data synchronization unit by using a switch or a router, so as to determine whether each node can work properly, and detect whether a copy stored on each node is available.

However, as the scale of the distributed database system is increasingly large, there is an increasing quantity of nodes in one data synchronization unit. Consequently, quantities of heartbeat requests and heartbeat responses that are sent between nodes significantly increase, and load of the entire distributed database system increases.

SUMMARY

Embodiments of the present invention provide a method, an apparatus, and a system for implementing a heartbeat mechanism, so as to reduce a quantity of heartbeat responses sent by a node, and reduce unnecessary resource consumption in a distributed database system.

To achieve the foregoing objective, the following technical solutions are used in the embodiments of the present invention:

According to a first aspect, an embodiment of the present invention provides a method for implementing a heartbeat mechanism, applied to a distributed database system, and including: obtaining, by a switching node, a heartbeat request sent by a first node to a second node, where the heartbeat request includes an identity of the first node and an identity of the second node, and the first node and the second node are different nodes connected to the switching node; recording, by the switching node, a first moment, wherein the first moment is a moment that the heartbeat request is received; querying, by the switching node according to the identity of the second node and from cached information, a second moment, wherein the second moment is a moment that the switching node most recently receives a message sent by the second node, where the cached information stores a correspondence between a moment at which the switching node receives a message sent by any node and an identity of the node; and if an absolute value of a difference between the first moment and the second moment is less than a threshold, sending, by the switching node, a heartbeat response to the first node.

It may be understood that because the switching node may record, in real time, a moment at which a message sent by each node in N nodes passes through the switching node, when a heartbeat request sent by the first node to the second node passes through the switching node, the switching node may determine, by querying a moment at which a message sent by the second node is most recently received, that the second node is available, so as to replace the second node to send a heartbeat response to the first node. Therefore, quantities of times of receiving a heartbeat request and sending a heartbeat response by each node in the N nodes are reduced. This avoids consumption of a large quantity of resources for receiving a large quantity of heartbeat requests and sending a large quantity of heartbeat responses.

In addition, when determining that the second node is available, the switching node may directly replace the second node to send a heartbeat response to the first node. That is, based on the heartbeat mechanism in this solution, a complete transmission path of the heartbeat request and the heartbeat response is as follows: the first node—the switching node—the first node. However, based on an existing heartbeat mechanism, a complete transmission path of the heartbeat request and the heartbeat response is as follows: the first node—the switching node—the second node—the switching node—the first node. It may be learned that in the method for implementing a heartbeat mechanism provided in this embodiment of the present invention, a heartbeat path may be further greatly reduced and a delay of a heartbeat response may be reduced, so as to reduce a fault detection time of an entire distributed database system, and improve reliability of the distributed database system.

In one embodiment, after the recording, by the switching node, a first moment, wherein the first moment is a moment that the heartbeat request is received, the method further includes: storing, by the switching node, a correspondence between the identity of the first node and the first moment in the cached information.

In one embodiment, the obtaining, by a switching node, a heartbeat request sent by a first node to a second node includes: receiving, by the switching node, a message sent by the first node to the second node, where the message carries the identity of the first node; and parsing, by the switching node, the message, so as to determine that the message is the heartbeat request sent by the first node to the second node.

In one embodiment, after the receiving, by the switching node, a message sent by the first node to the second node, the method further includes: if the message is not the heartbeat request sent by the first node to the second node, recording, by the switching node, a third moment at which the message is received; and storing, by the switching node, a correspondence between the identity of the first node and the third moment in the cached information.

In one embodiment, after the querying, by the switching node according to the identity of the second node and from cached information, a second moment, wherein the second moment is a moment that the switching node most recently receives a message sent by the second node, the method further includes: if the absolute value of the difference between the first moment and the second moment is greater than the threshold, forwarding, by the switching node, the heartbeat request to the second node.

According to a second aspect, an embodiment of the present invention provides a switching node, applied to a distributed database system, where the switching node is connected to a first node and a second node, and the switching node includes: an obtaining unit, configured to obtain a heartbeat request sent by the first node to the second node, where the heartbeat request includes an identity of the first node and an identity of the second node; a recording unit, configured to record a first moment, wherein the first moment is a moment that the heartbeat request is received; a query unit, configured to query, according to the identity of the second node and from cached information, a second moment, wherein the second moment is a moment that the switching node most recently receives a message sent by the second node, where the cached information stores a correspondence between a moment at which the switching node receives a message sent by any node and an identity of the node; and a sending unit, configured to: if an absolute value of a difference between the first moment and the second moment is less than a threshold, send a heartbeat response to the first node.

In one embodiment, the switching node further includes: a storage unit, configured to store a correspondence between the identity of the first node and the first moment in the cached information.

In one embodiment, the switching node further includes a parsing unit, where the obtaining unit is further configured to receive a message sent by the first node to the second node, where the message carries the identity of the first node; and the parsing unit is configured to parse the message, so as to determine that the message is the heartbeat request sent by the first node to the second node.

In one embodiment, the recording unit is further configured to: if the message is not the heartbeat request sent by the first node to the second node, record a third moment at which the message is received; and the storage unit is further configured to store a correspondence between the identity of the first node and the third moment in the cached information.

In one embodiment, the sending unit is further configured to: if the absolute value of the difference between the first moment and the second moment is greater than the threshold, forward the heartbeat request to the second node.

According to a third aspect, an embodiment of the present invention provides a switching node, including: a processor, a memory, a bus, and a communications interface, where the memory is configured to store a computer executable instruction, the processor and the memory are connected by using the bus, and when the switching node runs, the processor executes the computer executable instruction stored in the memory, so that the switching node performs the method for implementing a heartbeat mechanism in any one of the first aspect or the possible designs of the first aspect.

According to a fourth aspect, an embodiment of the present invention provides a system for implementing a heartbeat mechanism, including the switching node in any one of the second aspect or the possible designs of the second aspect, or any one of the third aspect or the possible designs of the third aspect, and a first node and a second node that are both connected to the switching node.

According to a fifth aspect, an embodiment of the present invention provides a computer storage medium, configured to store a computer software instruction used by the foregoing switching node, and the computer software instruction includes programs that are designed for the switching node to perform the foregoing aspects.

In embodiments of the present invention, names of the switching node, the first node, and the second node impose no limitation on devices or function modules. In actual implementation, the devices or the function modules may be represented by other names. Various devices or function modules shall fall within the scope of protection defined by claims of embodiments of the present invention and their equivalent technologies, provided that functions of the various devices or function modules are similar to the functions of the devices or function modules in embodiments of the present invention.

Compared with the prior art, because the switching node may record, in real time, a moment at which a message sent by each node in all nodes passes through the switching node, when a heartbeat request sent by the first node to the second node passes through the switching node, the switching node may determine, by querying a moment at which a message sent by the second node is most recently received, that the second node is available, so as to replace the second node to send a heartbeat response to the first node. Therefore, quantities of times of receiving a heartbeat request and sending a heartbeat response by each node are reduced. This reduces consumption of a large quantity of resources for receiving a large quantity of heartbeat requests and sending a large quantity of heartbeat responses.

These aspects or another aspect of the present invention are clearer and easier to understand in descriptions of the following embodiments.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In descriptions of the present invention, "multiple" means two or more than two, unless otherwise specified.

A core principle of a method for implementing a heartbeat mechanism provided in an embodiment of the present invention is as follows: all N nodes that are connected to a switching node (for example, a switch or a router) in a topology structure are used as a node group; because all messages (such as a heartbeat request, a heartbeat response, and a service message) sent by the N nodes need to pass through the switching node, that is, the switching node is located on a path through which every two nodes in the N nodes communicate with each other, the switching node may record, in real time, a moment at which a message sent by each node in the N nodes passes through the switching node. In this way, when a heartbeat request sent by a first node to a second node passes through the switching node, the switching node may determine, by querying a moment at which a message sent by the second node is most recently received, whether the second node is "alive". If the second node is "alive", the switching node directly returns a heartbeat response to the first node, with no need to forward the heartbeat request to the second node and then return a heartbeat response by the second node by using the switching node.

Figure 1:
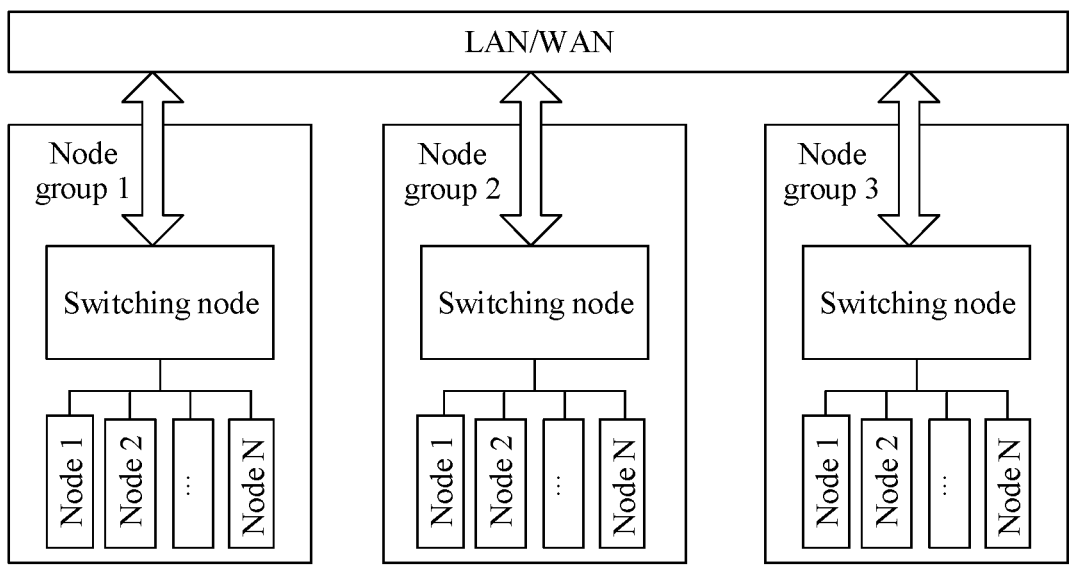
FIG. 1 is a diagram of an architecture of a distributed database system according to an embodiment of the present invention.

Specifically, the method for implementing a heartbeat mechanism provided in this embodiment of the present invention may be applied to a distributed database system shown in FIG. 1. All N nodes that are coupled to a switching node in a topology structure are used as a node group. All messages sent by the N nodes in the node group need to pass through a switching node in the node group. The distributed database system may include multiple node groups. A switching node in each node group is connected to a local area network (LAN) or a wide area network (WAN).

It should be noted that the N nodes in the node group may be an entity device having a storage function, for example, a computer, or may be a function module having a storage function, for example, a disk. This is not limited in this embodiment of the present invention.

It may be understood that because the switching node may record, in real time, a moment at which a message sent by each node in the N nodes passes through the switching node, when a heartbeat request sent by the first node to the second node passes through the switching node, the switching node may determine, by querying a moment at which a message sent by the second node is most recently received, that the second node is available, so as to replace the second node to send a heartbeat response to the first node. Therefore, quantities of times of receiving a heartbeat request and sending a heartbeat response by each node in the N nodes are reduced. This avoids consumption of a large quantity of resources for receiving a large quantity of heartbeat requests and sending a large quantity of heartbeat responses.

In addition, when determining that the second node is available, the switching node may directly replace the second node to send a heartbeat response to the first node. That is, based on the heartbeat mechanism in this solution, a complete transmission path of the heartbeat request and the heartbeat response is as follows: the first node—the switching node—the first node. However, based on an existing heartbeat mechanism, a complete transmission path of the heartbeat request and the heartbeat response is as follows: the first node—the switching node—the second node—the switching node—the first node. It may be learned that in the method for implementing a heartbeat mechanism provided in this embodiment of the present invention, a heartbeat path may be further greatly reduced and a delay of a heartbeat response may be reduced, so as to reduce a fault detection time of an entire distributed database system, and improve reliability of the distributed database system.

Figure 2:
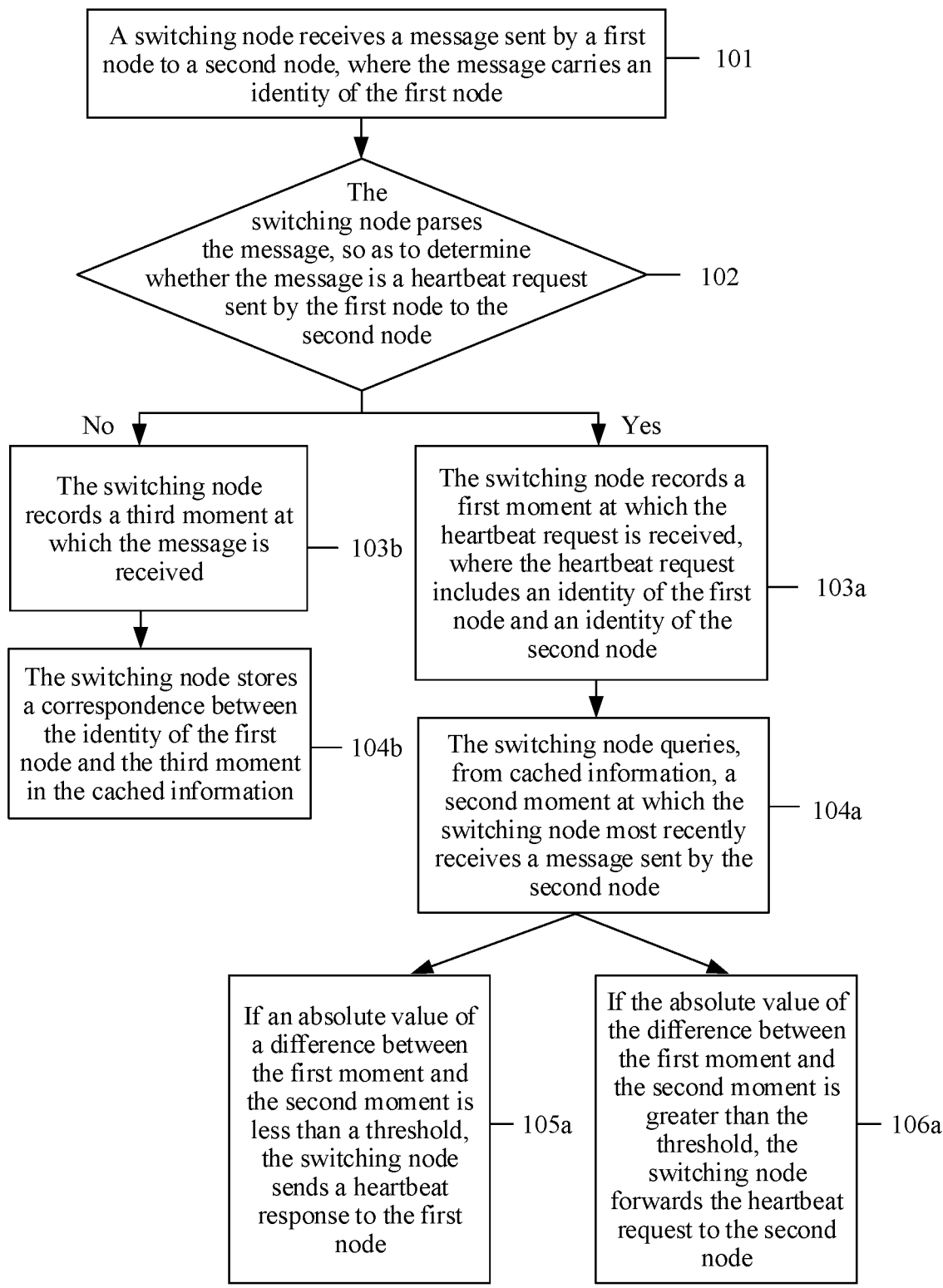
FIG. 2 is a schematic flowchart 1 of a method for implementing a heartbeat mechanism according to an embodiment of the present invention.

The following describes a method for implementing a heartbeat mechanism provided in an embodiment of the present invention in detail. As shown in FIG. 2, the method includes the following operations.

Operation 101. A switching node receives a message sent by a first node to a second node, where the message carries an identity of the first node.

The first node and the second node are two different nodes that are in one node group in FIG. 1 and that are connected to the switching node.

Because all messages sent by the first node to the second node need to pass though the switching node, the switching node may receive a message sent by the first node to the second node. The message carries the identity of the first node.

It should be noted that the message described herein may be any message, for example, a heartbeat request, a heartbeat response, or a service message.

Operation 102. The switching node parses the message, so as to determine whether the message is a heartbeat request sent by the first node to the second node.

In operation 102, the switching node parses the message received in step 101, so as to determine whether the message is the heartbeat request sent by the first node to the second node.

Specifically, the message may carry an identity of a message type. The message type may be specifically a heartbeat request, a heartbeat response, or a service message. For, example, one or more fields in the message may be reserved to indicate an identity of the message type. Therefore, in operation 102, the switching node parses the message received in operation 101, so as to obtain an identity of a message type carried in the message, and further determine, according to the identity of a message type, whether the message is the heartbeat request sent by the first node to the second node.

For example, the message may be sent and received in a packet form. The switching node obtains, by parsing first two bits in a header of the packet, the identity of a message type carried in the message, so as to determine, according to the identity of a message type, whether the message is the heartbeat request sent by the first node to the second node. For example, when the identity of a message type is 00, it may be determined that the message is the heartbeat request; when the identify of a message type is 10 in a first frame, it may be determined that the message is a service message. It should be noted that the foregoing method for parsing a message is merely used as an example for description, this embodiment of the present invention imposes no limitation on a manner in which the switching node parses a message.

Further, if the message is the heartbeat request sent by the first node to the second node, the switching node perform the following operations 103a to 104a to query a moment at which a message sent by the second node is most recently received, so as to determine whether the second node is "alive"; or if the message is not the heartbeat request sent by the first node to the second node, the switching node performs the following operations 103b to 104b to record, in real time, a correspondence between a moment at which a message sent by any node is received and an identity of the node.

Operation 103a. If the message is the heartbeat request sent by the first node to the second node, the switching node records a first moment, wherein the first moment is a moment that the heartbeat request is received. The heartbeat request includes an identity of the first node and an identity of the second node.

Specifically, in operation 103a, if the message is the heartbeat request sent by the first node to the second node, in addition to the identity of the first node, the heartbeat request further includes the identity of the second node, which is used to instruct the first node to send a heartbeat request to the second node.

In this case, a moment at which the heartbeat request is received and that is recorded by switching node is the first moment. The first moment may be considered as a moment at which the first node sends the heartbeat request.

Certainly, because there is a time difference between a moment at which the first node sends the heartbeat request and a moment at which the switching node receives and records the heartbeat request, the moment at which the first node sends the heartbeat request may be further carried in the heartbeat request. In this way, the switching node may use the carried moment at which the first node sends the heartbeat request as the first moment.

Operation 104a. The switching node queries, according to the identity of the second node and from cached information, a second moment, wherein the second moment is a moment that the switching node most recently receives a message sent by the second node.

The cached information stores a correspondence between a moment at which the switching node receives a message sent by any node and an identity of the node.

Table 1 shows the correspondence that is in the cached information and that is between a moment at which the switching node receives a message sent by any node and an identity of the node. Specifically, when the switching node receives a message sent by any node, as described in operation 101, because the message carries an identity of a node that sends the message, the switching node may record, in a memory of the switching node, a correspondence between a moment at which a message sent by any node is received and an identity of the node. In this way, in step 104a, when the first node sends a heartbeat request to the second node, the switching node may query, from the cached information, a moment at which the switching node most recently receives a message sent by the second node, that is, the second moment.

TABLE 1

| Identity of a node | Moment |
|---|---|
| 2 | 19:00:10 |
| 1 | 16:30:12 |

Certainly, the switching node may further update and maintain the cached information described in the foregoing table. For example, the switching node may periodically delete a correspondence between a moment at which a node sends a message and that is at least one day ago relative to a current time and an identity of the node.

Alternatively, the switching node may record only a correspondence between a moment that each node sends a message and that is closest to a current time and an identity of the node. For example, when receiving, at 19:0:59, a service message sent by a node whose identity is 2, the switching node may update a moment corresponding to a node whose identity is 2 in the first row in Table 1, so that only a correspondence between a moment at which a node sends a message and that is most closest to a current time and an identity of the node is stored in the cached information.

In this way, only a correspondence between an identity of each node in the N nodes in a node group and a last moment at which the node sends a message needs to be stored in the cached information, so that less information needs to be cached.

In addition, after operation 104a, a correspondence between the identity of the first node and the first moment may be further stored in the cached information indicates that the first node is available at the first moment, so that when subsequently receiving a heartbeat request sent to the first node, the switching node may obtain, in a timely manner and from the cached information, a first moment at which a message sent by the first node is most recently received.

Operation 105a. If an absolute value of a difference between the first moment and the second moment is less than a threshold, the switching node sends a heartbeat response to the first node.

In operation 105a, if the absolute value of the difference between the first moment obtained in step 103a and the second moment obtained in operation 104a is less than the threshold, that is, |first moment−second moment|<threshold, it indicates that the second node is in an available state not long ago, that is, in an "alive" state. Therefore, in this case, the switching node sends a heartbeat response to the first node, so that the first node determines that the second node is currently in an available state.

It should be noted that a person skilled in the art may set a specific value of the threshold according to practical experience. This is not limited in this embodiment of the present invention.

Operation 106a. If the absolute value of the difference between the first moment and the second moment is greater than the threshold, the switching node forwards the heartbeat request to the second node.

In contrast to operation 105a, if the absolute value of the difference between the first moment obtained in operation 103a and the second moment obtained in operation 104a is greater than the threshold, that is, |first moment−second moment|>threshold, it indicates that the second node sends no message to another node within a relatively long time period. In this case, the switching node cannot determine whether the second node is available. Therefore, the switching node forwards the heartbeat request to the second node.

After receiving the heartbeat request, if the second node is in an available state, that is, the second node runs properly, the second node feeds back a heartbeat response to the first node using the switching node; or if the second node is faulty, the second node cannot feed back a heartbeat response to the first node. However, if the first node does not receive, within a specific time period, a heartbeat response sent by the second node, or the first node does not receive a heartbeat response sent by the second node after continually sending a heartbeat request for multiple times, the first node determines that the second node is faulty.

Operation 103b. If the message is not the heartbeat request sent by the first node to the second node, the switching node records a third moment at which the message is received.

Specifically, if it is determined in operation 102 that the message received in operation 101 is not the heartbeat request sent by the first node to the second node, for example, the message is a heartbeat response or a service message, in this case, the switching node records a moment at which the message is received, that is, the third moment.

Operation 104b. The switching node stores a correspondence between the identity of the first node and the third moment in the cached information.

In operation 104b, the switching node stores the identity of the first node and the third moment in the cached information, so that when subsequently receiving a heartbeat request sent to the first node, the switching node may obtain, in a timely manner and from the cached information, the third moment at which a message sent by the first node is most recently received.

Figure 3:
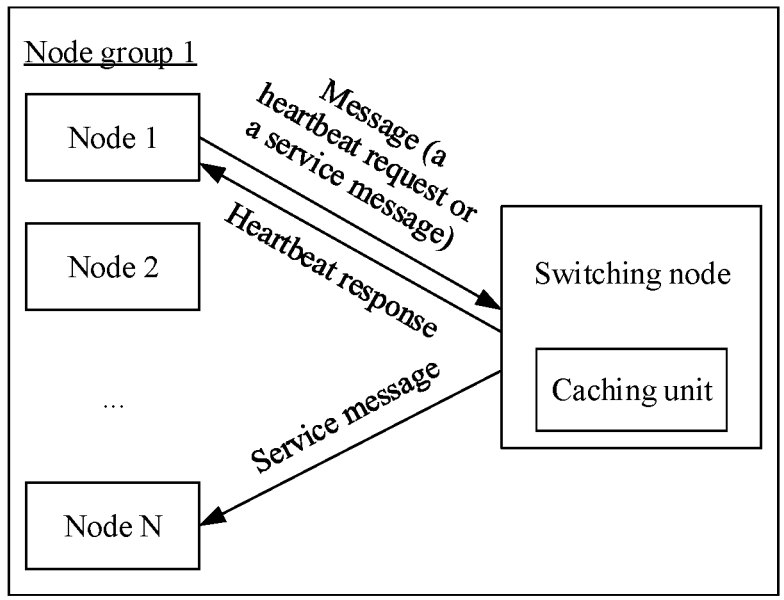
FIG. 3 is a schematic flowchart 2 of a method for implementing a heartbeat mechanism according to an embodiment of the present invention.

For example, the following describes the method for implementing a heartbeat mechanism described in operations 101 to 106a and 101 to 104b is described herein by using a node group 1 in FIG. 1, as shown in FIG. 3.

Referring to FIG. 3, in the node group 1, a switching node may be specifically a switch or a router, and all messages sent by N nodes in the node group 1 need to pass through the switching node.

A caching unit on the switching node stores cached information. As shown in Table 1, a correspondence between a moment at which the switching node receives a message sent by any node (that is, any node from a node 1 to a node N) and an identity of the node is recorded in the cached information.

Specifically, the node 1 may send a message to the switching node. The message carries an identity of the node 1, for example, the identity of the node 1 is 1. The message herein may be a message of any message type, for example, a heartbeat request or a service message. After receiving the message, the switching node parses the message, so as to determine whether the message is a heartbeat request sent by the node 1.

If the message is the heartbeat request sent by the node 1, the switching node records a first moment T1 at which the heartbeat request is received. The heartbeat request includes the identity of the node 1 and an identity of an identity of a node to which the node 1 sends the message, such as an identity of the node N. Further, the switching node queries, according to the identity of the node N and from the cached information in the caching unit, a second moment T2 at which the switching node most recently receives a message sent by the node N. In this case, if |T1−T2|<threshold, it indicates that the node N is in an available state not long ago, that is, in an "alive" state, and the switching node sends a heartbeat response to the node 1. Correspondingly, if |T1−T2|>threshold, the switching node forwards the heartbeat request to the node N.

Correspondingly, if the message is not the heartbeat request sent by the node 1, for example, the message is a service message sent by the node 1, the switching node records a third moment T3 at which the message is received, and stores a correspondence between the identity of the node 1 and the third moment T3 in the cached information, so that when subsequently receiving a heartbeat request sent to the node 1, the switching node may obtain, in a timely manner and from the cached information, a moment at which a message sent by the node 1 is most recently received.

According to the method for implementing a heartbeat mechanism provided in this embodiment of the present invention, a switching node obtains a heartbeat request sent by a first node to a second node, where the heartbeat request includes an identity of the first node and an identity of the second node; further, the switching node records a first moment, wherein the first moment is a moment that the heartbeat request is received, and queries, according to the identity of the second node and from cached information, a second moment, wherein the second moment is a moment that the switching node most recently receives a message sent by the second node, where the cached information stores a correspondence between a moment at which the switching node receives a message sent by any node and an identity of the node; and if an absolute value of a difference between the first moment and the second moment is less than a threshold, the switching node sends a heartbeat response to the first node. It may be learned that because the switching node may record, in real time, a moment at which a message sent by each node passes through the switching node, when a heartbeat request sent by the first node to the second node passes through the switching node, the switching node may determine, by querying a moment at which a message sent by the second node is most recently received, that the second node is available, so as to replace the second node to send a heartbeat response to the first node. Therefore, quantities of times of receiving heartbeat request and sending heartbeat response by each node are reduced. This avoids consumption of a large quantity of resources for receiving a large quantity of heartbeat requests and sending a large quantity of heartbeat responses.

Figure 4:
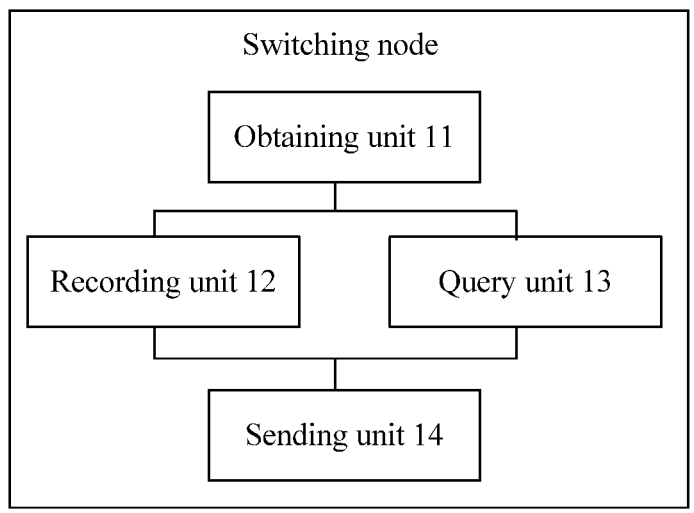
FIG. 4 is a schematic structural diagram 1 of a switching node according to an embodiment of the present invention.

FIG. 4 is a schematic structural diagram of a switching node according to an embodiment of the present invention. The switching node provided in this embodiment of the present invention may be configured to perform methods for implementing various embodiments of the present invention shown in FIG. 1 to FIG. 3. For ease of description, only a part related to this embodiment of the present invention is shown. For undisclosed technical details, refer to the various embodiments of the present invention shown in FIG. 1 to FIG. 3.

The switching node may be specifically a switch, a router, or the like having a programmable capability. This is not limited in the present invention. The switching node may be any hardware product that is programmable.

Specifically, according to one embodiment, the switching node includes:

an obtaining unit 11 configured to obtain a heartbeat request sent by the first node to the second node, where the heartbeat request includes an identity of the first node and an identity of the second node;

a recording unit 12 configured to record a first moment, wherein the first moment is a moment that the heartbeat request is received;

a query unit 13 configured to query, according to the identity of the second node and from cached information, a second moment, wherein the second moment is a moment that the switching node most recently receives a message sent by the second node, where the cached information stores a correspondence between a moment at which the switching node receives a message sent by any node and an identity of the node; and a sending unit 14 configured to: if an absolute value of a difference between the first moment and the second moment is less than a threshold, send a heartbeat response to the first node.

Figure 5:
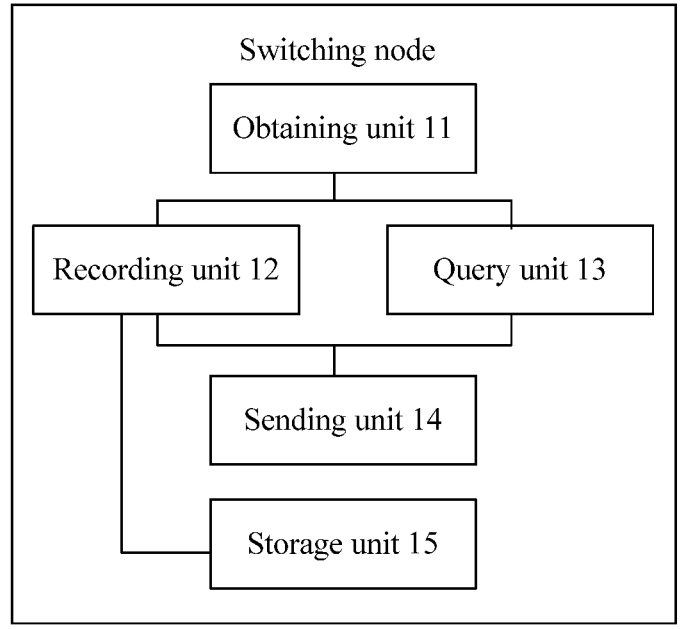
FIG. 5 is a schematic structural diagram 2 of a switching node according to an embodiment of the present invention.

Further, as shown in FIG. 5, according to one embodiment, the switching node further includes:

a storage unit 15 configured to store a correspondence between the identity of the first node and the first moment in the cached information.

Figure 6:
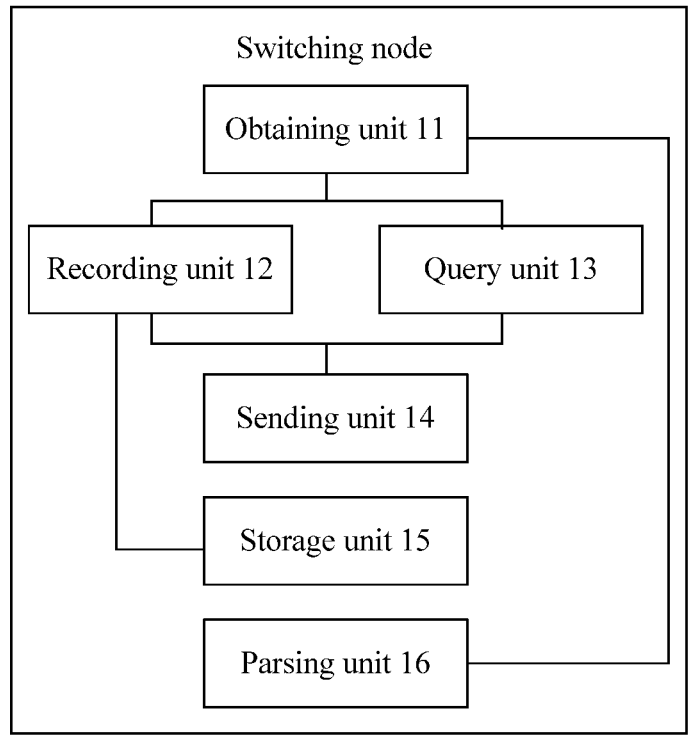
FIG. 6 is a schematic structural diagram 3 of a switching node according to an embodiment of the present invention.

Further, as shown in FIG. 6, according to one embodiment, the switching node further includes a parsing unit 16. The obtaining unit 11 is further configured to receive a message sent by the first node to the second node, where the message carries the identity of the first node. The parsing unit 16 is configured to parse the message, so as to determine that the message is the heartbeat request sent by the first node to the second node.

Further, the recording unit 12 is further configured to: if the message is not the heartbeat request sent by the first node to the second node, record a third moment at which the message is received. The storage unit 15 is further configured to store a correspondence between the identity of the first node and the third moment in the cached information.

Further, the sending unit 14 is further configured to: if the absolute value of the difference between the first moment and the second moment is greater than the threshold, forward the heartbeat request to the second node.

Figure 7:
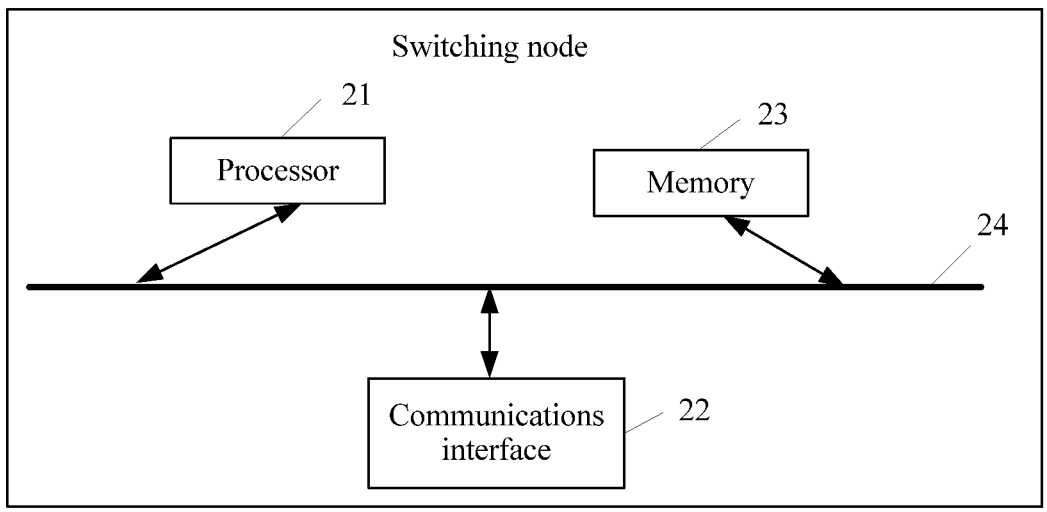
FIG. 7 is a schematic structural diagram of hardware of a switching node according to an embodiment of the present invention.

In addition, FIG. 7 is a schematic structural diagram of hardware of a switching node according to an embodiment of the present invention. As shown in FIG. 7, the switching node includes a processor 21, a communications interface 22, and a memory 23. The processor 21, the communications interface 22, and the memory 23 communicate with each other by using a bus 24.

The memory 23 is configured to store a computer executable instruction. The processor 21 and the memory 23 are connected by using the bus 24. When the switching node runs, the processor 21 executes the computer executable instruction stored in the memory 23, so that the switching node performs the method for implementing a heartbeat mechanism shown in FIG. 2. For a specific method for implementing a heartbeat mechanism, refer to related descriptions in the embodiment shown in FIG. 2 or FIG. 3, and details are not described herein again.

The processor 21 may be a central processing unit (CPU). Alternatively, the processor 21 may be another general purpose processor, a digital signal processor (DSP), an application-specific integrated circuit (ASIC), a field programmable gate array (FPGA) or another programmable logic device, a discrete gate or transistor logic device, a discrete hardware assembly, or the like. The general purpose processor may be a microprocessor or this processor may be any conventional processor, or the like.

The processor 21 is a control center of the switching node. The processor 21 performs various functions of the switching node by processing data received by the communications interface 22 and calling software or a program in the memory 23.

The communications interface 22 may be specifically an interface circuit, and is configured to receive or send a signal in a process of receiving or sending information or a request. After the communications interface 22 receives information sent by a terminal, the processor 21 processes the information. In addition, the communications interface 22 may communicate with a network or another device by means of wireless communications.

The memory 23 may include a volatile memory, for example, a random access memory (RAM). The memory 23 may also include a non-volatile memory, for example, a read-only memory (ROM), a flash memory, a hard disk drive (HDD), or a solid-state drive (SSD). The memory 23 may further include a combination of the foregoing types of memories. The processor 21 may run a software program stored in the memory 23, so as to execute various functions and applications of the switching node and perform data processing.

Specifically, in this embodiment of the present invention, the memory 23 may be configured to store cached information. The cached information stores a correspondence between a moment at which the switching node receives a message sent by any node and an identity of the node.

The bus 24 may include a data bus, a power bus, a control bus, a signal status bus, and the like. In this embodiment, for a clear description, various buses are represented by the bus 24 in FIG. 7.

Figure 8:
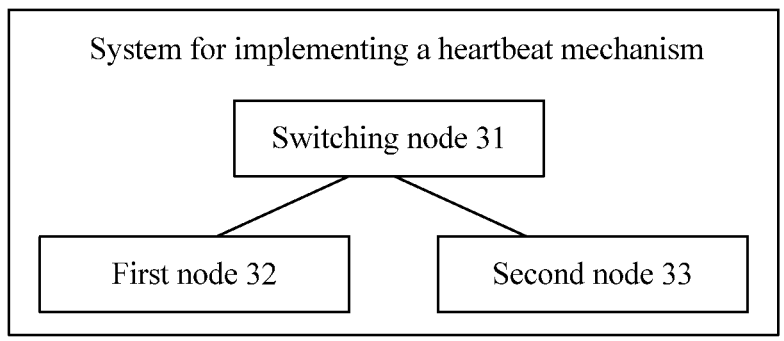
FIG. 8 is a schematic diagram of a system for implementing a heartbeat mechanism according to an embodiment of the present invention.

In addition, as shown in FIG. 8, an embodiment of the present invention provides a system for implementing a heartbeat mechanism, including any one of the foregoing switching nodes 31, and a first node 32 and a second node 33 that are both connected to the switching node 31. For a process in which the switching node interacts with the first node 32 and the second node 33, refer to related descriptions of the method for implementing a heartbeat mechanism in the embodiment shown in FIG. 2 or FIG. 3, and details are not described herein again.

The switching node 31 may be any node connected to both the first node 32 and the second node 33. An existing topology structure between the first node 32 and the second node 33 may be used, and a switch or a router on a communications path between the first node 32 and the second node 33 is used as the switching node 31. In this way, no additional node needs to be introduced to perform functions of the switching node 31.

According to the switching node and the system for implementing a heartbeat mechanism that are provided in this embodiment of the present invention, the switching node obtains a heartbeat request sent by a first node to a second node, where the heartbeat request includes an identity of the first node and an identity of the second node; further, the switching node records a first moment, wherein the first moment is a moment that the heartbeat request is received, and queries, according to the identity of the second node and from cached information, a second moment, wherein the second moment is a moment that the switching node most recently receives a message sent by the second node, where the cached information stores a correspondence between a moment at which the switching node receives a message sent by any node and an identity of the node; and if an absolute value of a difference between the first moment and the second moment is less than a threshold, the switching node sends a heartbeat response to the first node. It may be learned that because the switching node may record, in real time, a moment at which a message sent by each node passes through the switching node, when a heartbeat request sent by the first node to the second node passes through the switching node, the switching node may determine, by querying a moment at which a message sent by the second node is most recently received, that the second node is available, so as to replace the second node to send a heartbeat response to the first node. Therefore, quantities of times of receiving heartbeat request and sending heartbeat response by each node are reduced. This avoids consumption of a large quantity of resources for receiving a large quantity of heartbeat requests and sending a large quantity of heartbeat responses.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for implementing a heartbeat mechanism, comprising:
    obtaining, by a switching node, a heartbeat request sent by a first node to a second node in a distributed database system, wherein the heartbeat request comprises an identity of the first node and an identity of the second node, and the first node and the second node are different nodes connected to the switching node;
    recording, by the switching node, a first moment that the heartbeat request is received;
    querying, by the switching node according to the identity of the second node from cached information, a second moment that the switching node most recently receives a message sent by the second node, wherein the cached information stores a correspondence between the second moment and the identity of the second node;
    sending, by the switching node, a heartbeat response to the first node, when an absolute value of a difference between the first moment and the second moment is less than a threshold; and
    forwarding, by the switching node, the heartbeat request to the second node, when the absolute value of the difference between the first moment and the second moment is greater than the threshold.

2. The method according to claim 1, wherein the method further comprises:
    storing, by the switching node, a correspondence between the identity of the first node and the first moment in the cached information.

3. The method according to claim 1, wherein obtaining the heartbeat request comprises:
    receiving, by the switching node, a message sent by the first node to the second node, wherein the message includes the identity of the first node; and
    parsing, by the switching node, the message sent by the first node, to determine that the message sent by the first node is the heartbeat request.

4. The method according to claim 3, wherein the method further comprises:
    recording, by the switching node, a third moment at which the message sent by the first node is received, wherein the message sent by the first node is not the heartbeat request; and
    storing, by the switching node, a correspondence between the identity of the first node and the third moment in the cached information.

5. A switching node, comprising a processor, a memory, and a communications interface, wherein:
    the memory is configured to store computer executable instructions, the processor, the communications interface and the memory are connected, and the processor is configured to execute the computer executable instructions stored in the memory so as to:
    obtain, via the communications interface, a heartbeat request sent by a first node to a second node, wherein the heartbeat request comprises an identity of the first node and an identity of the second node, and the first node and the second node are different nodes connected to the switching node;

record, a first moment that the heartbeat request is received;

query, according to the identity of the second node from cached information, a second moment that the switching node most recently receives a message sent by the second node, wherein the cached information stores a correspondence between the second moment and the identity of the second node;

send a heartbeat response to the first node via the communications interface, when an absolute value of a difference between the first moment and the second moment is less than a threshold; and forward the heartbeat request to the second node, when the absolute value of the difference between the first moment and the second moment is greater than the threshold.

6. The switching node according to claim 5, wherein the processor is further configured to:

store, a correspondence between the identity of the first node and the first moment in the cached information.

7. The switching node according to claim 5, wherein the processor is further configured to:

receive, via the communications interface, a message sent by the first node to the second node, wherein the message includes the identity of the first node; and parse the message sent by the first node to determine that the message sent by the first node is the heartbeat request.

8. The switching node according to claim 7, wherein the processor is further configured to:

record a third moment at which the message sent by the first node is received, wherein the message sent by the first node is not the heartbeat request; and store a correspondence between the identity of the first node and the third moment in the cached information.

9. A system comprising a switching node, a first node and a second node that are both connected to the switching node, wherein the switching node is configured to:

obtain a heartbeat request sent by a first node to a second node, wherein the heartbeat request comprises an identity of the first node and an identity of the second node;

record a first moment that the heartbeat request is received;

query, according to the identity of the second node from cached information, a second moment that the switching node most recently receives a message sent by the second node, wherein the cached information stores a correspondence between the second moment and the identity of the second node;

send a heartbeat response to the first node, when an absolute value of a difference between the first moment and the second moment is less than a threshold; and forward the heartbeat request to the second node, when the absolute value of the difference between the first moment and the second moment is greater than the threshold.

10. The system according to claim 9, wherein the switching node further stores a correspondence between the identity of the first node and the first moment in the cached information.

11. The system according to claim 9, wherein the switching node is configured to:

receive a message sent by the first node to the second node, wherein the message includes the identity of the first node; and parse the message sent by the first node to determine that the message sent by the first node is the heartbeat request.

12. The system according to claim 11, wherein the switching node is further configured to:

record a third moment at which the message sent by the first node is received, wherein the message sent by the first node is not the heartbeat request; and store a correspondence between the identity of the first node and the third moment in the cached information.

* * * * *